(12) United States Patent
Brobst et al.

(10) Patent No.: US 6,378,002 B1
(45) Date of Patent: Apr. 23, 2002

(54) OBJECT ORIENTED SERVER PROCESS FRAMEWORK WITH IMPLICIT DATA HANDLING REGISTRY FOR REMOTE METHOD INVOCATIONS

(75) Inventors: Curtis Howard Brobst; Steve J. Gansemer; Cheryl L. Greiner, all of Rochester, MN (US)

(73) Assignee: International Business Machines Corporation,, Armonk, NY (US)

( * ) Notice: Subject to any disclaimer, the term of this patent is extended or adjusted under 35 U.S.C. 154(b) by 0 days.

(21) Appl. No.: 08/910,457

(22) Filed: Aug. 5, 1997

(51) Int. Cl.[7] ................................................. G06F 9/54

(52) U.S. Cl. ..................................... 709/315; 709/330

(58) Field of Search .............................. 709/310, 315, 709/330

(56) References Cited

U.S. PATENT DOCUMENTS

| | | | |
|---|---|---|---|
| 4,943,932 A | 7/1990 | Lark et al. ..................... 706/60 |
| 5,057,996 A | 10/1991 | Cutler et al. ................. 709/315 |
| 5,101,364 A | 3/1992 | Davenport et al. ......... 345/723 |
| 5,119,475 A | 6/1992 | Smith et al. ................. 345/866 |
| 5,181,162 A | 1/1993 | Smith et al. ................. 707/530 |
| 5,195,172 A | 3/1993 | Elad et al. ..................... 706/62 |
| 5,226,161 A | 7/1993 | Khoyi et al. ................. 709/316 |
| 5,247,693 A | 9/1993 | Bristol .......................... 717/5 |
| 5,249,270 A | 9/1993 | Stewart et al. ............... 709/222 |
| 5,257,384 A | 10/1993 | Farrand et al. ............. 710/105 |
| 5,261,080 A | 11/1993 | Khoyi et al. ................. 710/65 |
| 5,274,572 A | 12/1993 | O'Neill et al. ............... 702/57 |
| 5,276,775 A | 1/1994 | Meng .......................... 706/51 |
| 5,287,447 A | 2/1994 | Miller et al. ................. 345/804 |
| 5,293,470 A | 3/1994 | Birch et al. ................. 345/634 |
| 5,297,283 A | 3/1994 | Kelly, Jr. et al. ........... 709/316 |
| 5,315,703 A | 5/1994 | Matheny et al. ............ 345/700 |
| 5,367,633 A | 11/1994 | Matheny et al. ............ 345/764 |
| 5,369,766 A | 11/1994 | Nakano et al. ............. 709/332 |
| 5,379,430 A | 1/1995 | Nguyen ......................... 707/3 |
| 5,388,264 A | 2/1995 | Tobias, II et al. ........... 707/103 |
| 5,390,325 A | 2/1995 | Miller ......................... 714/38 |
| 5,396,626 A | 3/1995 | Nguyen ......................... 717/1 |
| 5,398,336 A | 3/1995 | Tantry et al. ............... 707/103 |
| 5,778,228 A | * 7/1998 | Wei ............................. 709/328 |
| 5,884,316 A | * 3/1999 | Bernstein et al. ........... 707/103 |
| 5,915,252 A | * 6/1999 | Misheski et al. ........... 707/103 |

OTHER PUBLICATIONS

Text of *IBM Technical Disclosure Bulletin*, vol. 37, DeBinder et al., Feb. 1994, "Results Folder Framework", pp. 431–432.

(List continued on next page.)

*Primary Examiner*—St. John Courtenay, III
*Assistant Examiner*—Lewis A. Bullock, Jr.
(74) *Attorney, Agent, or Firm*—Baker, Maxham, Jester & Meador; Roy W. Truelson

(57) ABSTRACT

An object oriented framework provides a set of objects that perform computer system server functions and that permit a framework user to add extensions for defining a Server Process category of objects that perform service processes for the network and exchange implicit data with remote processes of the network, and also define an Implicit Data Handler Registry (IDHR) class of objects that receive registration information from Provider objects of the Server Process category. Each Provider object of a Server Process registers with the IDHR of its local node if the service process produces implicit data for use by remote processes that request service, such that the IDHR object requests implicit data from a registered Provider in response to remote method requests to network remote processes, receives implicit data from remote processes and passes the data to registered Provider objects, requests implicit data from registered Provider objects for reply to requests from remote processes, and provides Provider objects with implicit reply data received back from remote nodes from whom service was requested. In this way, implicit data handling is controlled through registration with the IDHR objects and is transparent to the Server Process objects.

20 Claims, 8 Drawing Sheets

OTHER PUBLICATIONS

Text of *IBM Technical Disclosure Bulletin*, vol. 36, Coskun, N., Jun. 1993, "Persistent Framework Independent Record/Playback Framework", pp. 261–264.

Text of *IBM Technical Disclosure Bulletin*, Baker et al., Oct. 1991, "Model View Schema", pp. 321–322.

Text of *IBM Technical Disclosure Bulletin*, Baker et al., Oct. 1991, "Office Container Class", pp. 309–310.

Text of *IBM Technical Disclosure Bulletin*, Cavendish et al., Jul. 1991, "Icon Pane Class", pp. 118–119.

Text of *IBM Technical Disclosure Bulletin*, Baker et al., Jun. 1991, "Distribution List Class", p. 159.

Text of *IBM Technical Disclosure Bulletin*, Cavendish et al., Jun. 1991, "Object–Oriented Documentaton Tool", pp. 50–51.

Text of *IBM Technical Disclosure Bulletin*, Allard et al., Feb. 1990, "Object–Oriented Programming in C—the Linnaeus System", pp. 437–439.

Text of *IBM Technical Disclosure Bulletin*, vol. 38, No. 1, Jan. 1995, pp. 411–414, J. Knapman "Generating Specific Server Programs in Distributed Object–Oriented Customer Information Control System".

Text of *IBM Technical Disclosure Bulletin*, vol. 37, No. 12, Dec. 1994, pp. 19–20, Al–Karmi et al., "Events Set for Event Tracing in Distributed Object–Oriented Systems".

Text of *IBM Technical Disclosure Bulletin*, vol. 37, No. 12, Dec. 1994, pp. 375–378, Acker et al., "Automatically Generating Formatted Documentation for Object–Oriented Class Libraries".

Text of *IBM Technical Disclosure Bulletin*, vol. 37, No. 11, Nov. 1994, pp. 71–72, Behrs et al., "Device Support Framework to Support ISO DPA 10175 and POSIX 1387.4".

Text of *IBM Technical Disclosure Bulletin*, vol. 37, No. 7, Jul. 1994, pp. 145–146, Banda et al., "Exception Management Algorithm for Multi–Threaded Method Invocation".

Text of *IBM Technical Disclosure Bulletin*, vol. 37, No. 6B, Jun. 1994, pp. 553–556, Gest et al., "Portable Object–Oriented Event Manager".

Abstract for WPO Patent Application NO. WO 95/04966, F.T. Nguyen, Feb. 16, 1995, "Automatic Management of Components in Object–Oriented System".

Abstract for U.S. Patent No. 5,388,264, Milne et al., Feb. 7, 1995, "Object–Oriented Framework System for Enabling Multimedia Presentations with Routing and Editing of MIDI Information".

Abstract for WIPO Patent Application No. WO 94/23364, Heninger et al., Oct. 13, "Framework Processing Apparatus for Application Software".

Abstract for U.S. Patent No. 5,369,766, Heninger et al., Nov. 29, 1994, "Object Oriented Application Processing Apparatus".

Abstract from WIPO Patent Application No. WO 9422081, Sep. 29, 1994, "Hardware–Independent Interface for Interrupt Processing", G.O. Norman et al.

Abstract for WIPO Patent Application No. 94/19752, Anderson et al., Sep. 1, 1994, "Concurrent Framework Processing Apparatus For Two or More Users".

Abstract for WIPO Patent Application No. 94/19751, Anderson et al., Sep. 1, 1994, "Concurrent Framework Processing Apparatus For Application Users".

Abstract for WIPO Patent Application No. 94/19740, Goldsmith et al., Sep. 1, 1994 "Framework Processor of Object–Oriented Application".

Abstract for WIPO Patent Application No. 94/15286, Goldsmith et al., Jul. 7, 1994, "Object–Oriented Framework for Object Operating System".

Abstract for WIPO Patent Application No. 94/15282, Anderson et al., Jul. 7, 1994, "Dialog System Object–Oriented System Software Platform".

Abstract for WIPO Patent Applicaton No. 94/15281, Anderson et al., Jul. 7, 1994, "Atomic Command Object–Oriented System Software Platform".

Abstract from WIPO Patent Application No. WO 9415285, Jul. 7, 1994, "Object–Oriented Notification Framework System", D.R. Anderson et al.

Abstract for U.S. Patent No. 5,119,475, Schoen et al., Jun. 2, 1992, "Object–Oriented Framework for Menu Definition".

Abstract No. 95–091003/12, "Flexible Multi–Platform Partitioning for Computer Applications in Object Oriented System".

Abstract for WIPO Patent Application No. 95/01610, Koko et al., Jan. 12, 1995, "Object Oriented Product Structure Management in Computer–Aided Product Design".

Abstract for WIPO Patent Application No. 95/04967, Feb. 16, 1995, "Access Method to Data Held in Primary Memory Based Data Base".

Abstract for WIPO Patent Application No. 95/02219, Helgeson et al., Jan. 19, 1995, "Distributed Computation Based on Movement, Execution and Insertion of Processes in Network".

Abstract from U.S. Patent NO. 5,371,891, "Object Constructions in Compiler in Object Oriented Programming Language", J. Gray et al., Dec. 6, 1994.

Abstract from EPO Patent Application NO. EP 622730, "Encapsulation of Extracted Portions of Documents Into Objects", M.A. Malamud, Nov. 2, 1994.

Abstract for EPO Patent No. 619544, S. Danforth, Oct. 12, 1994, "Language–Neutral Object–Oriented Programming".

Abstract for WIPO Patent No. 94/20912, Sep. 15, 1994, "Object–Oriented System for Managing Financial Instruments".

Inspec Abstract No. C9504–7460–043, Sells et al., 1995, "Implementation of the Architecture for a Time–Domain Dynamical System Simulation in a Very High–Level Pictorial Object–Oriented".

Inspec Abstract No. C9504–7460–042, Coleman et al., 1995, "An End–To–End Simulation of A Surveillance System Employing Architecture Independence, Variable Fidelity Components and Software Reuse".

Inspec Abstract No. C9503–6140D–045, Satoh et al., 1995, "Process Algebra Semantics for a Real Time Object Oriented Programming Language".

Inspec Abstract No. C9501–7160–020, C. Le Pape, 1993 "The Cost of Genericity: Experiments With Constraint–Based Representations of Time–Tables".

Inspec Abstract No. C9501–6140D005, S. Vinoski, 1994, "Mapping CORBA ILD Into C++".

Inspec Abstract No. C9501–7330–007, Salminen et al., 1994, "Modeling Trees Using an Object–Oriented Scheme".

Inspec Abstract No. C9412–6110B–221, Berghel et al., 1992, "A Generic Object–Oriented Concurrency Mechanism for Extensibility and Reuse of Synchronization Components".

Inspec Abstract No. B9412–6210Q–016, from Qingzhong et al., 1992, "An Object–Oriented Model for Intelligent Networks".

Inspec Abstract No. C9412-7810-003, from Jung et al., 1993, "Development of an Object-Oriented Anthropometric Database for and Ergonomic Man Model".

Inspec Abstract No. C9412-6110J-014 from Griss et al., 1994, "Object-Oriented Reuse".

Inspec Abstract NO. C9411-6130B-108, from Mili et al., 1992, "Building a Graphical Interface for a Reuse-Oriented CASE Tool".

Inspec Abstract No. C9411-7100-029 from C. Le Pape, 1994, "Implementation of Resource Constraints in Ilog Schedule: A Library for the Development of Constraint--Based Scheduling Systems".

Inspec Abstract No. C9411-6115-035 from Mili et al., 1991, "SoftClass: An Object-Oriented Tool for Software-Reuse".

Inspec Abstract No. C9410-6180G-015, from Eichelberg et al., 1993, "Integrating Interactive 3D-Graphics into an Object-Oriented Application Framework".

Inspec Abstract No. B9409-6210M-025, from Hellemans et al., 1994, "An Object-Oriented Approach to Dynamic Service Descriptions".

Inspec Abstract No. C9409-6180-059, from Wang et al., 1993, "A Framework for User Customization".

Inspec Abstract No. C9408-6110B-016, from Chen et al., 1994, "An Experimental Study of Using Reusable Software Design Frameworks to Achieve Software Reuse".

Inspec Abstract No. C9048-7420-021, from Pirklbauer et al., 1994, "Object-Oriented Process Control Software".

Inspect Abstract No. C9408-6110J-011 from Gyu-Chung et al., 1993, "System Methodologies of Object-Oriented Programs".

Inspec Abstract No. C9407-7420D-045, from Desai et al., 1994, "Controller Structure Definition Via Intelligent Process Control".

Inspec Abstract No. C9407-6140D-014, from Satoh et al., 1994, "Semantics for a Real-Time Object-Oriented Programming Language".

Inspec Abstract NO. C9406-6150N-015, from Schmidt et al., 1994, "The Service Configurator Framework: An Extensible Architecture for Dynamically Configuring Concurrent, Multi-Service Network Daemons".

Inspec Abstract No. C9405-6180G-031, from Woyak et al., 1993, "A Motif-Like Object-Oriented Interface Framework Using PHIGS".

Inspec Abstract No. C9403-6180-027, 1991, "An Event-Object Recovery Model for Object-Oriented User Interfaces" from Proceedings of ACMSymposium on User Interface Software & Technology.

Inspec Abstract No. C9504-6130B-049, from A. van Dam, 1995, "VR as a Forcing Function: Software Implications of a New Paradigm".

Inspec Abstract No. C9504-6140D-024, from Sheffler et al., 1995, "An Object-Oriented Approach to Nested Data Parallelism".

Inspec Abstract No. C9503-6110B-045, from Rosiene et al., 1995, "A Data Modeling Framework for Queueing Network Models".

Inspec Abstract No. B9503-8110B-023, from Mautref et al., 1995, "An Object-Oriented Framework for the Development of Interactive Decision Support Systems".

Inspec Abstract No. C9503-7160-026, from Menga et al., 1995, "An Object-Oriented Framework for Enterprise Modelling".

Inspec Abstract No. C9502-6130G-006, "Support for Enterprise Modelling in CSCW", P. Hennessy et al., 1994.

Inspec. Abstract No. C9502-7810C-058, from Lin et al., 1995, "Can CAL Software Be More Like Computer Games?".

Inspec Abstract No. C9501-6115-039, from Elia et al., 1993, "G++: An Object Oriented Environment for Developing Distributed Applications".

Inspec Abstract No. C9412-7330-186 from Righter et al., 1994, "An Object-Oriented Characterization of Spatial Ecosystem Information".

Inspec Abstract No. C9412-6160J-025 from J. livari, 1994, "Object-Oriented Information Systems Analysis: A Comparison of Six Object-Oriented Analysis Methods".

Inspec Abstract No. C9412-6110J-006, from Lau et al., 1993, "Using SOM for Tool Integration".

Inspec Abstract No. C9411-6160J-011, from Odberg et al., 1992, "A Framework for Managing Schema Versioning in Object-Oriented Databases".

Inspec Abstract No. C9406-7490-012, "A Discrete-Event Object-Oriented Modeling Enviroment for Sawmill Simulation".

Inspec Abstract No. C9406-6115-048, 1993, "Constructing Multi-View Editing Environments Using MViews".

Inspec Abstract No.4664213, "Maintaining Information about Persistent Replicated Objects in a Distributed System"., 1993 IEEE Conference on Distributed Computing Systems.

Inspec Abstract No. C9406-6110J-029, "A Comparison of Object-Oriented Analysis and Design Methods", Proceedings of C++ World 1993.

Inspec Abstract No. C9406-0310F-011, 1993, "Cost-Benefit Analysis of Object-Oriented Technology".

Inspec. Abstract No. C9406-6110J-007, from, J.D. Grimes, 1993, "Objects 101-An Implementation View", Proceedings of C++ World 1993.

Inspec Abstract No. 4647921, from Uhorchak et al., 1993, "An Object-Oriented Class Library for Creating Engineering Graphs Using PHIGS".

Inspec Abstract No. 4642214, from, Marshall et al., 1992, "Using VDM Within an Object-Oriented Framework".

Inspec Abstract No. 4626386, from Arora et al., 1993, "Building Diverse Environments with PCTE Workbench".

Inspec Abstract No. 4622794, from Campbell et al., 1993, "A Techniqe for Documenting the Framework of an Object-Oriented System".

Inspec Abstract No. 4618974, from Bowers, 1993, "Some Principles for the Encapsulation of the Behaviour of Aggregate Objects".

Inspec Abstract No. 4616931, from, Islam et al., 1993, "Uniform Co-Scheduling Using Object-Oriented Design Techniques".

Inspec Abstract No. 4613481, from Thieme et al., 1993, "Schema Integrating in Object-Oriented Databases".

Inspec Abstract NO. 4603430, from G. Booch, 1994, "Desiging an Application Framework".

Inspec Abstract No. 4596323, from Frank et al., 1993, "An Integrated Enviroment for Desiging Object-Oriented Enterprise Models".

Inspec Abstract No. 4593721, Periyasamy et al, 1993, "A Formal Framework for Design and Verification of Robotic Agents".

Inspec Abstract No. 4588839, from L. Fisher, 1992, "Constructing a Class Library for Microsoft Windows".

Inspec Abstract No. 4588834, from G. Olander, 1992, "Chembench: Redesign of a Large Commercial Application Using Object–Oriented Techniques".

Inspec Abstract No. 4566447, from J. Rossazza, 1992, "An Object–Centered Fuzzy Representation".

Inspec Abstract NO. 4565630, from Karpovich et al., 1993, "A Parallel Object–Oriented Framework for Stencil Algorithms".

Inspec Abstract No. C9402–6150G–002, from Bruegge et al., 1993, "A Framework for Dynamic Program Analyzers".

Inspec Abstract No. 4550414, from Parrish et al., 1993, "Automated Flow Graph–Based Testing of Object–Oriented Software Modules".

Inspec Abstract No. 4540729, from Bailes et al., "The ecology of Class Refinement".

Inspec Abstract No. 4534334, from Campbell et al., 1991, "A Technique for Documenting the Framework of an Object–Oriented System".

Inspec Abstract No. 4534330, from Istavrinos et al., 1992, "Experiences with an Object–Oriented Mapper for Coherent Distributed Shared Memory".

Inspec Abstract No. 4528985, from Beneventano et al., 1993, "Taxonomic Reasoning with Cycles in LOGIDATA+".

Inspec Abstract No. 4525743, from Hakimzadeh et al., 1993, "Instance Variable Access Locking for Object–Oriented Databases".

Inspec Abstract No. 4512593, from H. Sakai, 1993, "A Method for Contact Design and Delegation in Object Behavior Modeling".

Inspec Abstract No. B9310–6210L–099, "Templates, Types and Classes in Open Distributed Processing", 1993.

Inspec Abstract No. 4459325, from Kesim et al., 1992, "On the Evolution of Objects in a Logic Programming Framework".

Inspec Abstract No. 4447153, from Klein et al., 1992, "An Object–Oriented Framework for Curves and Surfaces".

Inspec Abstract No. 4426852, from Benveniste et al., 1992, "Concurrent Programming Notations in the Object–Oriented Language Arche".

Inspec Abstract No. 4425343, from Demurjian et al., 1993, "Programming Versus Databases in Object–Oriented Paradigm".

Inspec Abstract No. 4417604, from Kraiem et al., 1992, "Mapping of Conceptual Specifications Into Object–Oriented Programs".

Inspec Abstract No. 4417563, from E. Maim, 1992, "Recognizing Objects from Constraints".

Inspec Abstract No. 4411998, from Yi Deng et al., 1992, "Unifying Multi–Paradigms in Software System Design".

Inspec Abstract No. 4408394, from Allen et al., 1992, "GEM: Global Event Management in CAD Frameworks".

Inspec Abstract No. 4400350, from Y. Shoham, 1993, "Agent–Oriented Programming".

Inspec Abstract No. 4395549, from Hogstrom et al., 1992, "Portability and Data Structures in Scientific Computing–Object–Oriented Design of Utility Routines in Fortran".

Inspec Abstract No. 4391388, from Thomas et al., 1992, "A Generic Object–Oriented Concurrency Mechanism for Extensibility and Reuse of Synchronization Components".

Inspec Abstract No. 4387201, from Chu et al., 1992, "A Pattern Based Approach of Integrating Data and Knowledge to Support Cooperative Query Answering".

Inspec Abstract No. 4366189, from Holt, et al, 1992, "A Framework for Using Formal Methods in Object–Oriented Software Development".

Inspec Abstract No. 4356300, from Bertino et al., 1993, "Path–Index: An Approach to the Efficient Execution of Object–Oriented Queries".

Inspec Abstract NO. 4341376, from Bertino et al., 1992, "Optimization of Object–Oriented Queries Using Path Indices".

Inspec Abstract No. 4331060, from Lau et al., 1992, "An Object–Oriented Class Library for Scalable Parallel Heuristic Search".

Inspec Abstract No. 4318465, from P. Madany, 1992, "Object–Oriented Framework for File Systems".

Inspec Abstract No. 4302722, from Eggenschwiler et al., 1992, "ET++SwapsManager: Using Object Technology in the Financial Engineering Domain".

Inspec Abstract No. 4294324, from S. Nichol, 1992, "Extending Turbo Vision".

Inspec Abstract No. 4297404, from Tanaka et al., 1992, "Two–Level Schemata and Generalized Links for Hypertext Database Models".

Inspec Abstract No. 4287814, from Natarajan et al., 1992, "Issues in Building Dynamic Real–Time Systems".

Inspec Abstract No. 4281362, from Marshall et al., 1991, "Using VDM withing an Object–Oriented Framework".

Inspec Abstract No. 4275707, from Tsukamoto et al., 1992, "DOT: A Term Representation Using DOT Algebra for Knowledge–Bases".

Inspec Abstract No. 4275698, from Van den Bussche et al., 1991, "Evaluation and Optimization of Complex Object Selections".

Inspec Abstract No. 4275693, from Giannotti et al., 1991, "Non–Determination in Deductive Databases".

Inspec Abstract No. 4270361, from Artale et al., "Introducing Knowledge Representation Techniques in Database Models".

Inspec Abstract No. 4270125, from Becker et al., 1991, "Reusable Object–Oriented Specifications for Decision Support Systems".

Inspec Abstract No. 4258492, from M. Ball, 1992, "Inside Templates: Implementing C++Strategies".

Inspec Abstract No. 4258051, from Rudensteiner et al., 1992, "Set Operations in Object–Based Data Models".

Inspec Abstract No. 4244023, from George et al., 1991, "An Object–Oriented Data Model to Represent Uncertainty in Coupled Artificial Intelligence–Database Systems".

Inspec Abstract No. 4234438, from Madany et al., 1991, "Organizing and Typing Persistent Objects Within an Object–Oriented Framework".

Inspec Abstract No. 4152687, from M. Wolczko, 1992, "Encapsulation, Delegation and Inheritance in Object–Oriented Languages".

Inspec Abstract No. 4117514, fro Wuwongse et al., 1991, "An Object–Oriented Approach to Model Management".

Inspec Abstract No. C9204–6110J–017, "Choices Frameworks and Refinement", R.H. Campbell et al., 1991.

Inspec Abstract No. 4090970, from P. Kougiouris, 1991, "Device Management Framework for an Object–Oriented Operating System".

Inspec Abstract No. 4077440, fro A. Mahler, 1991, "Organizing Tools in a Uniform Environment Framework".

Inspec Abstract No. 4067033, from Shaw et al., 1990, "Experience with the ET++ Application Framework".

Inspec Abstract No. 4060084, from Muller et al., 1990, "ODICE: Object–Oriented Hardware Description in CAD environment".

Inspec Abstract No. 4050569, from Di Giovanni et al., 1990, "HOOD Nets".

Inspec Abstract No. C91072815, from Holtkamp et al., 1990, "DEMOM–A Description Based Media Object Data Model".

Inspec Abstract No. C91072016, from A. Lane, 1991, "/DOS/C++–Application Frameworks".

Inspec Abstract No. C91072574, from Hemery et al., "An Analysis of Communication and Multiprogramming in the Helios Operating System".

Inspec Abstract No. C9106478, from Madany et al., 1990, "A Class Hierarchy for Building Stream–Oriented File Systems".

Inspec Abstract No. C91064580, from Gamma et al., 1989, "Integration of a Programming Environment Into ET++–A Case Study".

Inspec Abstract No. C91058815, from Menga et al., 1990, "G++: An Environment for Object Oriented Analysis and Prototyping".

Inspec Abstract No. B91052096, from Cusack et al., 1990, "Object–Oriented Specification in LOTOS and Z, or My Cat Really is Object–Oriented".

Inspec Abstract No. C91053475, from Queinnec et al., 1988, "An Open Ended Data Representation Model for EU–LISP".

Inspec Abstract No. C91053151, from E. Cusack, 1991, "Refinement, Conformance and Inheritance".

Inspec Abstract No. C91042802, from T. Yokoyama, 1990, "An Object–Oriented and Constraint–Based Knowledge Representation System for Design Object Modeling".

Inspec Abstract No. C9141980, from Choi et al., 1991, "Graph Interpretation of Methods: A Unifying Framework for Polymorphism in Object–Oriented Programming".

Inspec Abstract No. C91042655, from Q. Li, 1991, "Extending Semantic Object Model: Towards More Unified View of Information Objects".

Inspec Abstract No. C91024852, from Pierra et al., 1990, "An Object Oriented Approach to Ensure Portability of CAD Standard Parts Libraries".

Inspec Abstract No. C91010951, from T. Helton, 1990, "Level5 Object".

Inspec Abstract No. B90075006, from Gossain et al., 1989, "Designing a Class Hierarchy for Domain Representation and Reusability".

Inspec Abstract No. C91003997, from J. Muys–Vasovic, 1989, "MacApp: An Object–Oriented Application Framework".

Inspec Abstract No. C91004708, from Bertino et al., 1990, "Optimization of Queries Using Nested Indices".

Inspec Abstract No. C90052277, from I. Tervonen, 1990, "Object–Oriented Development as a Multiview Software Construction Methodology".

Inspec Abstract No. C90052627, from Schrefl et al., 1988, "A Knowledge–Based Approach to Overcome Structural Differences in Object Oriented Database Integration".

Inspec Abstract No. C90047457, from Yokoyama et al., 1990, "A Constraint–Based and Object–Oriented Knowledge Representation".

Inspec Abstract No. C90034818, from Q. Chen, 1988, "Extending the Object–Oriented Paradigm for Supporting Complex Objects".

Inspec Abstract No. C90030609, from Forde et al., 1990, "Object–Oriented Finite Element Analysis".

Inspec Abstract No. C90007733, from Weinand et al., 1989, "Design and Implementation of ET++, A Seamless Object–Oriented Application Framework".

Inspec Abstract No. C89062837, from Pasquier–Boltuck et al., 1988, "Prototyping an Interactive Electronic Book System Using an Object–Oriented Approach".

Inspec Abstract No. C89056727, from Campbell et al., 1989, "Principles of Object–Oriented Operating System Design".

Inspec Abstract No. C89056859, from Hull et al., 1989, "On Accessing Object–Oriented Databases: Expressive Power, Complexity, and Restrictions".

Inspec Abstract No. C89049257, from Madany et al., 1989, "Class Hierarchy for Building Stream–Oriented File Systems".

Inspec Abstract No. C89039001, from Brophy et al., 1989, "A Framework for Multiple, Concurrent Graphical Representation".

Inspec Abstract No. C89033226, from Corradi et al., 1988, "PO: An Object Model to Express Parallelism".

Inspec Abstract No. C89014870, from R. King, 1988, "Semantic and Object–Oriented Database Support for Software Environments".

Inspec Abstract No. C89003142, from Tenma et al., 1986, "A System for Generating Language–Oriented Editors".

Inspec Abstract No. C88013915, from Woelk et al., 1987, "Multimedia Information Management in an Object–Oriented Database System".

Inspec Abstract No. C88007447, from P. Allen, 1987, "A Framework for Implementing Multisensor Robotic Tasks".

Inspec Abstract No. C87007043, from Whitted et al., 1986, "Exploiting Classes in Modeling and Display Software".

Inspec Abstract No. C86039588, from K. Fukunaga,, 1985, "Prompter: A Knowledge Based Support Tool for Code Understanding".

Inspec Abstract No. C86024804, from Greenspan et al., 1986, "A Requirements Modeling Language and Its Logic".

Inspec Abstract No. C84005713, from Meyer et al., 1983, "Towards a Two–Dimensional Programming Enviromment".

Inspec Abstract No. C81005505, from Mylopoulos et al., 1980, "Some Features of the TAXIS Data Model".

* cited by examiner

OBJECT ORIENTED SERVER PROCESS FRAMEWORK WITH IMPLICIT DATA HANDLING REGISTRY FOR REMOTE METHOD INVOCATIONS

BACKGROUND OF THE INVENTION

1. Field of the Invention

This invention relates generally to data processing systems and, more particularly, to object oriented programming systems and processes.

2. Description of the Related Art

In a computer system having a distributed processing environment, individual computers are interconnected and form nodes of a database network, such as a local area network (LAN). Some of the nodes may comprise network servers that support end-user applications at each node. Such servers are supported by processes that provide services, such as transaction control and security checking. Execution of applications and server functions is initiated at the nodes, but frequently the programming logic providing the services is spread across different nodes, or address spaces. To ease the programming task of the application programmer developer, it is important that support services be provided in a transparent manner, such that the application developer and end-user do not realize what components or processes are actually providing support.

Support services may be performed by one or more server processes executing in the operating environment of a node. These support services frequently require data relating to the requesting process, the service provider, service parameters, and the like. Such data may not comprise server process parameters or program arguments, but are referred to as implicit data. In an object oriented programming (OOP) environment, the server processes can be implemented as server process objects. That is, the operating system of the server supports an object oriented programming environment in which an OOP object representing the server process manages other server process objects that perform the server support functions.

OOP techniques encapsulate, or bind together, data and the methods that operate on them. This encapsulation permits program development to more closely model real-world systems for problem solution and breaks up program development efforts into smaller, more manageable pieces. OOP programs are developed around object classes that have attributes, also called data values, and methods, also called functions. Although OOP techniques have done much to improve program development efficiency, such techniques still require a great degree of code generation on the part of developers and limit program reuse.

OOP frameworks have been developed in an effort to further reduce program development costs. A framework is a set of OOP classes that embodies a predetermined set of attributes and methods for providing a common group of behaviors. An application program developer utilizes the framework and builds upon it, starting with the classes, attributes, and methods defined by the framework designer and adding subclasses and attributes and modifying methods depending on the problem to be solved. Such changes to the framework are typically referred to as framework extensions, and are made possible by the OOP notions of inheritance and polymorphism. The challenge confronting framework developers, then, is to define a set of classes and methods that will best support the desired problem solution and will accept the most likely framework extensions. Thus, the designer of a framework must carefully assess what framework users will most likely need in the way of classes and attributes.

As noted above with respect to distributed programming environments, it is important that server services be provided in a transparent manner, such that the application developer and end-user do not realize what components are actually providing support and do not have to be concerned with such details. In a local-only environment this is not complicated, because implicit data required by services to accomplish their task is in the same address space as the services to be provided, and thus is readily available. In a distributed programming environment, the data is spread out across the network, and it is much more difficult to provide these services in a transparent manner. The programming logic providing these services may be spread out over the network nodes, and the data needed by these services also may be spread around the network. Moreover, it can be difficult to ascertain what implicit data is needed by underlying services before they can pass data between themselves.

From the discussion above, it should be apparent that there is a need for a server process framework that permits program developers to more quickly develop and more easily maintain server process programs and exchange implicit data among such processes. The present invention fulfills this need.

SUMMARY OF THE INVENTION

In accordance with the present invention, a reusable object oriented (OO) server framework in an object oriented programming system of a network node defines a Server Process category of objects, the objects of which perform service processes for the network and exchange implicit data with remote processes of the network, and also define an Implicit Data Handler Registry (IDHR) class of objects that receive registration information from Provider objects of the Server Process category. Each Provider object of a Server Process registers with the IDHR of its local node if the service process produces implicit data for use by remote processes that request service, such that the IDHR object requests implicit data from a registered Provider in response to requests to network remote processes, receives implicit data from remote processes and passes the data to registered Provider objects, requests implicit data from registered Provider objects for reply to requests to remote processes, and provides Provider objects with implicit reply data received back from remote nodes from whom service was requested. In this way, implicit data handling is controlled through registration with the IDHR objects and is transparent to the Server Process objects.

The framework includes classes (such as the Provider class) for which it is anticipated extension subclassing with new attributes and methods will occur. A server program developer can customize the extension classes to meet the needs of users and create all user interfaces with the server program, permitting the server developer to more quickly complete program development and more easily perform software maintenance. It is expected that the program developer will provide the enduser interface, which establishes a means for the server end-user to communicate with the server program to receive, process, and report data. Thus, the framework of the present invention frees the program developer to concentrate on server process program features, which can easily be implemented by extending the OO classes and methods of the OO framework. The framework thereby provides a base from which a variety of server processes can be quickly and efficiently produced.

The framework includes object oriented classes that specify object data attributes and methods. The server process program developer who adopts the framework of the invention and extends it is free to add specialized service objects consistent with those specified in the framework to provide a unique suite of functions and operations, resulting in the production of a server process that can then be utilized by an end user. A single server object of the framework provides a data object location for managing the objects that will carry out operations of the server process. Using OOP principles, the framework adopter can add server process features not present in the framework to support functions and processes desired by customers in a particular market niche. In this way, the framework adopter maximizes the exploitation of program commonality and the reuse of programming efforts, thereby reducing program development time and software maintenance costs.

Other features and advantages of the present invention should be apparent from the following description of the preferred embodiment, which illustrates, by way of example, the principles of the invention.

DESCRIPTION OF THE PREFERRED EMBODIMENT

In the preferred embodiment of the invention, the object oriented framework for a distributed programming environment includes a Server Process category of objects that provide a service process for the network, and provide and receive implicit data from remote processes of the network, and include an Implicit Data Handler Registry (IDHR) class of objects that receive registration information from a Provider class of objects in the Server Process category. The IDHR class of objects is a registry, comprising data objects that are maintained by the local host computer, with which a process will register if the local process has a need to exchange implicit data transparently with remote method requests from other nodes. Each of the Provider objects includes four methods comprising: (1) a provideImplicitDataForRequest( ) method that provides implicit data to the IDHR class of objects for sending to a remote Process object with remote method requests; (2) a receiveImplicitDataFromRequest( ) method that provides implicit data to the Provider from remote method requests; (3) a provideImplicitDataForReply( ) method that provides implicit data to the IDHR class of objects for sending with the reply to a remote request; and (4) a receiveImplicitDataFromReply( ) method that provides implicit data to the Provider from a remote method request reply.

To explain the framework of the present invention and the manner in which it operates, an exemplary server program development procedure using the framework will be described, followed with a description of a computing system environment suitable for the development procedure and the OO structure of the framework. Next, the object class structure of the framework will be described, followed by a description of the processing of the extended framework, using a flow diagram description of the server operation.

1. Server Program Development

Figure 1:
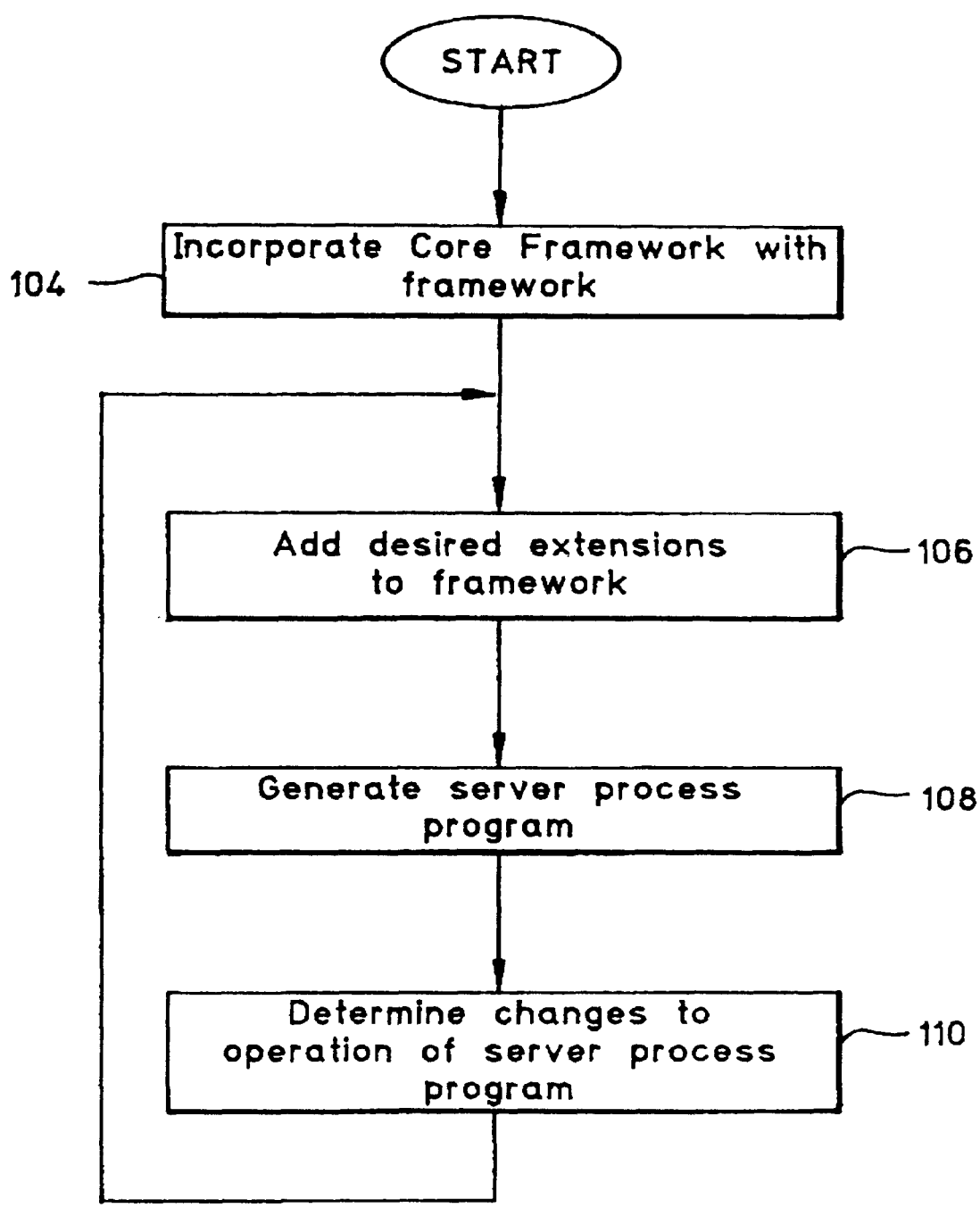
FIG. 1 is a flow diagram representation of the application development process that utilizes the framework of the invention to provide a server program.

FIG. 1 is a flow diagram representation of the steps performed with a computer system to produce a server program using the framework of the present invention. The preferred embodiment is implemented in the "Java" programming language, but it should be understood that other programming languages also could be used.

A server program constructed with the framework of the preferred embodiment is designed to obtain certain information from objects of related core classes, as described further below. Such information will include computer and network information concerning the computer system environment in which the server is to operate, identification of users and protocols, as well as other information needed to carry out operating in the computer system. In the preferred embodiment, these core classes are organized into a core framework (CF) that is complementary to the framework of the present invention.

The Server Process program developer provides a user interface with the features and "look and feel" desired, and combines operating interface features of the core object classes with the structure and functionality of the server OOP framework constructed in accordance with the present invention, and also adds particular framework extensions as needed, to generate a server program. The resulting server program can be used by customers, such as network operating system programmers, to carry out server functions and other tasks in the computer system program domain. In the following description, "framework" will refer to the framework illustrated in the drawing figures and "server process program" will refer to a computer system program that comprises an implementation of the extended framework, produced by a server process program developer who uses the framework, to perform server functions.

In the FIG. 1 flow diagram, the first step of server program development is to incorporate a core framework of classes with the Server Process framework of the invention, as represented by the flow diagram box numbered 104. In the preferred embodiment, the core framework (CF) is a set of base business application classes that are shared by multiple development programs. The first step of FIG. 1 includes the incorporation of any such object classes necessary for the system on which the server program will run. The preferred embodiment achieves operating platform independence and system program inter-operability by extending classes from the base CF framework. Thus, in this first step 104, the program developer will incorporate object classes necessary for achieving operating system independence and system program inter-operability by extending and subclassing from the CF classes. In this way, the server program can interface with multiple operating systems because only the CF extensions need change to accommodate new operating systems, while the server program can remain the same. In a similar way, associated client programs can more easily interface with the extended server program because the core, common set of CF classes will be known and will form a common interface.

The next step of server program development is to add desired extensions to the server framework itself, including the user interface. To implement this part of the program development process, the server process developer-framework adopter must decide upon the particular extensions needed for the desired server process operations and user interface, including any modifications or extensions to the service class attributes and behaviors. The framework extensions are implemented by the program developer in a manner dependent on the particular computer system on which the framework is received and manipulated. Such processing is represented in FIG. 1 by the flow diagram box numbered 106.

After the framework extensions are decided upon, the next step is to generate the server program (that is, the executable code). This step is represented by FIG. 1 the flow diagram box numbered 108. The generation of an executable server program is generally referred to as program compilation. The details of this step also will depend on the particular computer system on which the framework is used, as will be appreciated by those skilled in the art. Changes to the compiled program might be desired, both as part of the initial program debug and as part of revisions due to comments received from actual use, such as supporting additional server functions. The process of determining such desired changes is represented by the flow diagram box numbered 110. When such changes are determined, they must be implemented into the server program structure in the form of modified classes, attributes, and methods, which comprise further extensions to the framework. This is represented by the flow diagram path from the "determine changes" step at box 110 back to the "add desired extensions" step at box 106.

Thus, the design of the framework provides base classes on which server program developers can build to add specific features they deem important. With the core CF business classes, the framework classes can remain platform independent so that framework extensions are simplified. In this way, the server program is easily modified without need for writing multiple versions of the program code because the revision of framework classes, attributes, and methods in accordance with the invention is platform independent. Easier development of new code, and seamless operation with applications using the same core classes, is ensured.

2. Operational Structure

Figure 2:
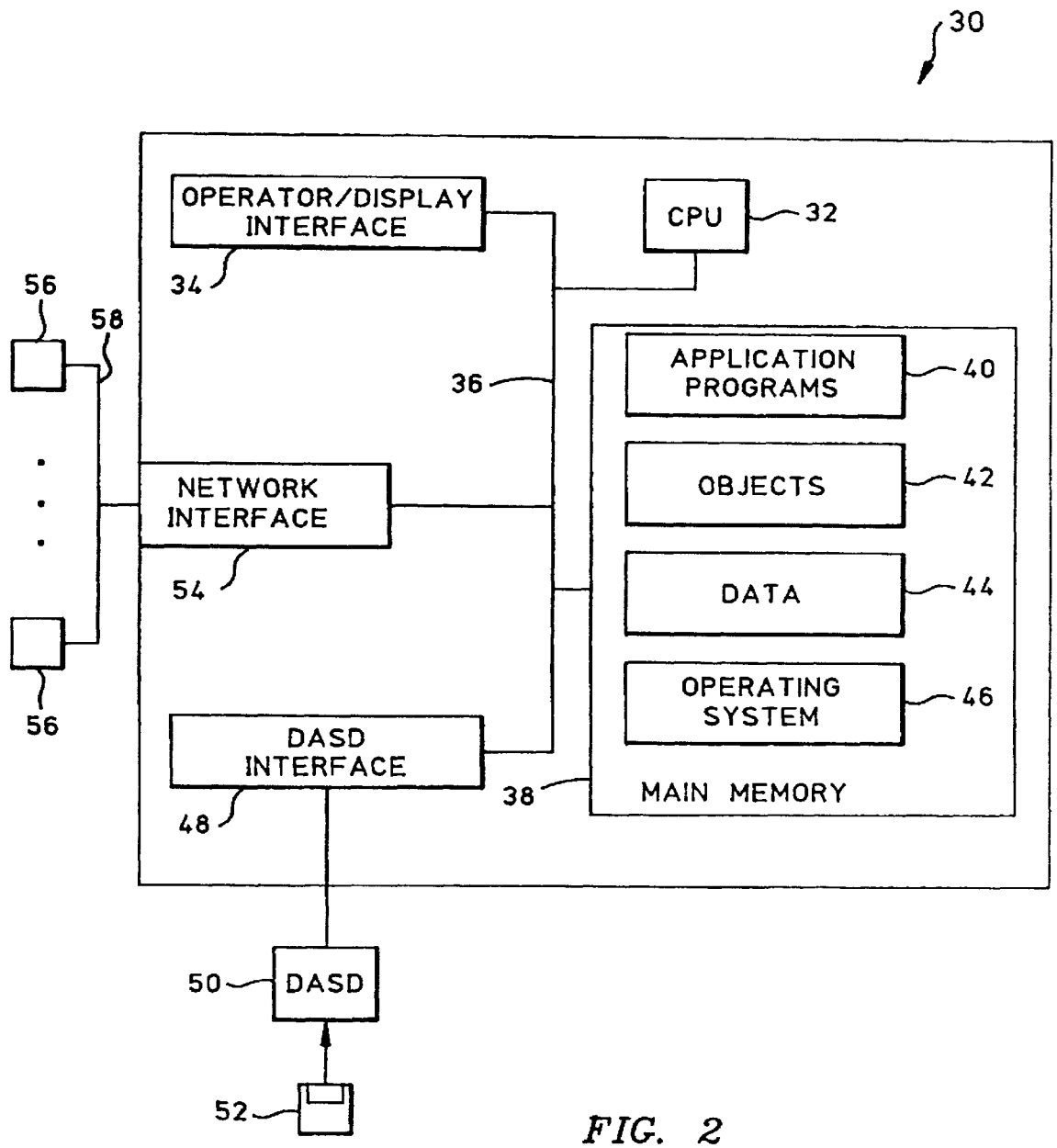
FIG. 2 is a block diagram of a computer system constructed in accordance with the invention.

FIG. 2 is a block diagram of a computer system 30 constructed in accordance with the present invention. The computer system is suitable for utilizing the server framework of the invention to develop a server program, and for extending the framework. The computer system 30 includes a central processing unit (CPU) 32 that operates in response to operator commands, which it receives from an operator/display interface 34 to which it is connected by a system bus 36. The CPU also communicates over the system bus with a main memory 38. The main memory is illustrated containing a variety of data structures, including application programs 40, objects 42, data 44, and an operating system 46. The application programs include programs such as the server program generated by extending the framework of the present invention. The main memory 38 is represented as a single entity, but those skilled in the art will appreciate that the main memory can comprise a combination of random access memory (RAM), hard disk drives, optical disk drives, and other storage devices containing logically segmented storage locations.

The operating system 46 preferably supports an object oriented programming environment such as provided, for example, by the C++ programming language and the "Java" programming language. The application programs 40 are invoked, or launched, by a user through the operator/display interface 34. The application programs can be written in a variety of languages, including C++ and Java. The objects 42 are object data structures (described below) of an object oriented programming language, such as C++ or Java.

The computer system 30 also includes a direct access storage device (DASD) interface 48 that is connected to the system bus 36 and also is connected to a DASD 50. Those skilled in the art will appreciate that the DASD 50 can receive and read from program products comprising machine-readable storage devices 52, such as magnetic media disks on which are recorded program instructions whose execution implements the framework of the present invention. The storage devices 52 also can comprise, for example, media such as optical disks and other machine-readable storage devices. The computer system 30 also includes a network interface 54 that permits communication between the CPU 32 and other computer systems 56 over a network 58. The other computer systems can comprise, for example, computer systems similar in construction to the exemplary computer system 30. Thus, the computer system 30 can receive data into the main memory 38 over the network 58 after communication between the computer systems 30, 56 has been established by well-known methods that will be understood by those skilled in the art without further explanation.

3. Server Process Framework Components

Figure 3:
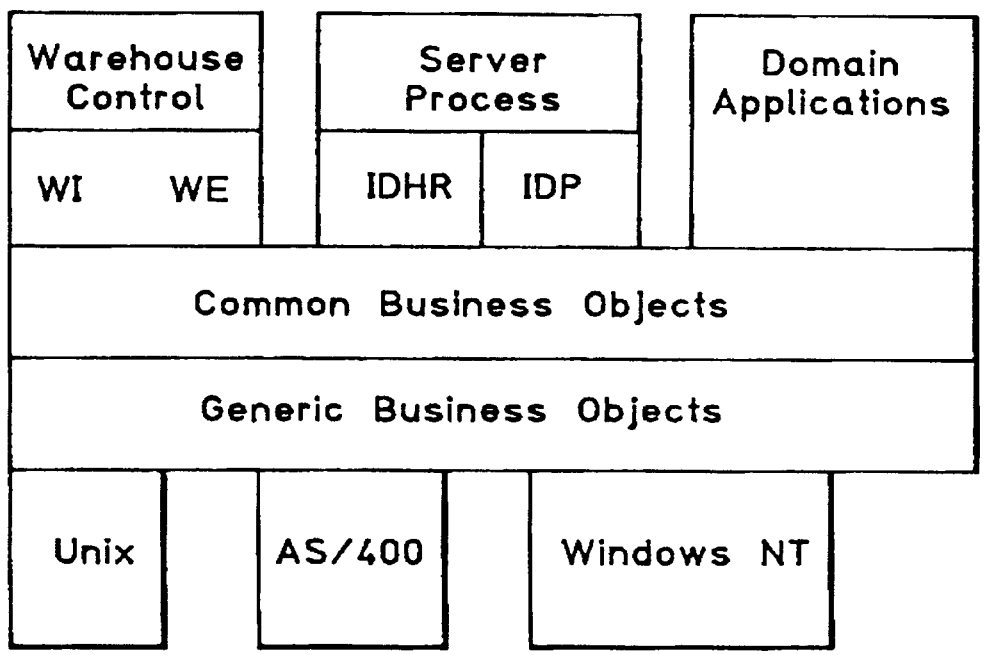
FIG. 3 is a representation of the computer system of FIG. 2, showing the service mechanisms that comprise the Server Process framework of the invention, and also showing related common business objects utilized by the extended Server Process framework of the invention.

FIG. 3 is a representation of the OO framework that operates in the system of FIG. 2, showing the Server Process program that is the subject of this description. The Server Process is shown having an Implicit Data Handler Registry (IDHR) module and a Provider module, attached to a Common Business Objects framework (CBOF) mechanism and a Generic Business Objects framework (GBOF) mechanism, which together comprise a core framework (CF) utilized by the framework of the invention. The CF provides common functionality to permit communication between system application mechanisms (such as the Server Process) and different operating platforms, which are indicated in FIG. 3 by the modules indicated as "Unix", "AS/400", and "Windows NT" attached to CF.

Server program developers (and developers of other programs that interface with CF) will add subclassing to the classes of which CBOF and GBOF are comprised. The classes of CBOF, for example, will include company identification classes that can serve as base classes for defining networks, databases, or companies to multiple programs. A CBOF "Network" class might contain general network configuration identifying information. Another system program, such as a network communication program, might include classes that identify networks that are connected to the network of the invention. The GBOF classes are more directly related to the operating system and computer system side of the operating environment. That is, the GBOF classes are responsible for object persistence according to the operating system and object environment being supported, so that a Server object that wants to maintain an object in persistent data storage must interface with GBOF classes. All application programs in related subject areas, or domains, should be able to make use of the common object classes specified by the CBOF and GBOF classes.

In FIG. 3, a mechanism called Warehouse Control is shown attached to the CF (CBOF/GBOF) combination, along with a module identified as "Domain Applications".

The Warehouse Control mechanism comprises a Warehouse Internal (WI) module and a Warehouse External (WE) module. All of these mechanisms are shown attached to the CF to indicate that other modules may be developed that communicate with the Server program. In this way, other programs may communicate with the Server program and similarly interface with different operating platforms. It should be understood that the mechanisms shown interfacing with the CF and interfacing with the alternative operating systems are exemplary only. That is, it is contemplated that additional domain applications may interface with the Server mechanism, and it also is contemplated that additional operating platforms may interface with the Server mechanism.

The CF interface, however, does not form a part of the invention described herein. As noted above, those skilled in the art should be able to produce, without further explanation, a framework that provide the common functionality between operating systems and application domains that are provided by CF.

4. Server Category Diagram

Figure 4:
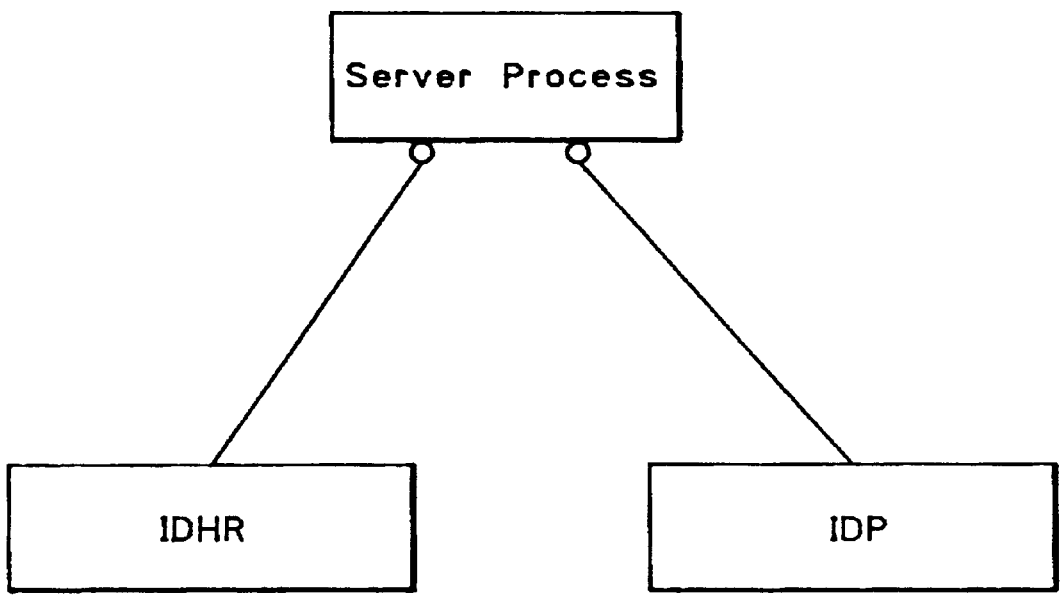
FIG. 4 is a category diagram representation of the Server Process category.

FIG. 4 is a category diagram for the Server Process program of the extended framework implemented in the computer system of FIG. 2. Those skilled in the art will appreciate that the categories illustrated in FIG. 4 contain groups of OOP classes that encapsulate data attributes and behaviors, and are stored in the memory of the computer system. Such classes can be implemented, for example, in a computer system operating environment that supports the "Java" programming language or the "C++" programming language. It should be understood that a "category" as used in this description refers to describing the classes that make up the framework in terms of class categories, for purposes of easier explanation. The categories do not necessarily represent a structure that is reflected in any programming implementation of the framework. Those skilled in the art will understand that the OO classes specify characteristics of the objects that will be instantiated at run time and will cooperate to perform the program functions.

The program includes a Server Process category that is responsible for creating the programming environment for the framework. In particular, the Server Process category contains those objects that host the Provider objects that will actually perform the server process implicit data handling functions. That is, the operating logic that makes a system process such as the Server Process program exchange implicit data with other network processes is contained within the Provider objects.

Thus, the Server Process category comprises a method or methods that create the objects it is instructed to create and provides the means for those objects to resolve any interdependencies with each other. In this way, all of the logic that provides server functioning is contained within the objects of the server program process, so that the means for resolving interdependencies comprises the methods and attributes of the service objects.

5. Provider Class Diagram

Figure 5:
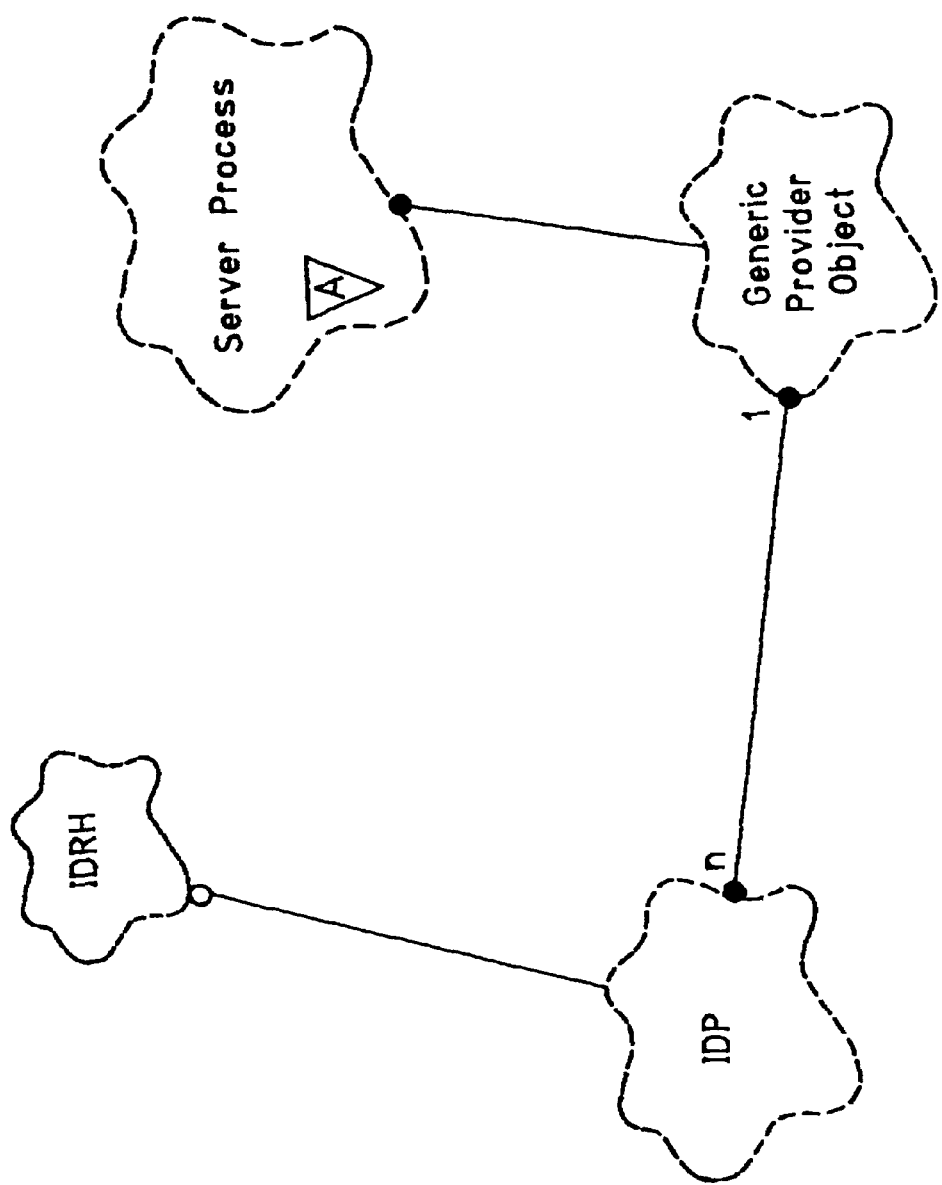
FIG. 5 is a class diagram of the Server Process category illustrated in FIG. 4, showing the Provider class of the Server Process.

There is no uniform standard for describing OO programming, but FIG. 5 and this description will use the widely followed convention that class names comprise descriptive words whose initial letters are upper case, typically concatenated together. FIG. 5 is a class diagram that represents framework objects with object "clouds" and illustrates the characteristics of the primary server framework classes.

GenericProviderObject

The GenericProviderObject in FIG. 5 is not an actual, specific object class, but is used to represent any class member (to be defined by the framework user) that is potentially a Provider object of the Server Process. The GenericProviderObject class cloud is used to illustrate the relationship between the potential Provider object and the classes of the framework. For example, those skilled in the art will appreciate that the connecting line between the Provider class cloud and the GenericProviderObject cloud indicates a one-to-n "has" relationship from the Provider cloud to the GenericProviderObject cloud. The IDRH class cloud is shown in FIG. 5 only to indicate that the IDRH objects interact with the Provider objects. It should be understood that IDRH objects do not have an inheritance or "has" relationship with the Provider objects. Moreover, it should be understood that each computer of the network that performs server processing, local and remote, and that operates in accordance with the invention, will have objects such as those illustrated in the class diagram of FIG. 5.

6. Processing of the Extended Framework

The framework user/program developer will utilize the class and method definitions, as described above, with appropriate extensions and overrides, to produce a desired server program. Thus, as is the case with object oriented programming principles, details of the extended framework processing will depend on the particular extensions implemented by the framework user. Nevertheless, the processing enabled by the framework can be described in terms of the classes and methods defined by the present invention. Particular processing tasks performed by classes of the extended system can be described in a step-wise, procedural fashion. The following description, therefore, should be understood to apply to the operating steps performed by the extended framework. Those skilled in the art, however, will understand that the flow of processing is not necessarily sequential through the flow diagram boxes, as objects will perform processing in accordance with their attributes and methods. The framework classes define server functions and network configurations, track user configuration changes, and communicate system operations to the computer user.

The processing of the extended framework is illustrated by the flow diagrams of FIGS. 6 through 9. These flow diagrams illustrate the processing steps carried out by the preferred embodiment of the computer system illustrated in FIG. 2.

In all the flow diagrams, the processes referred to are the various program processes that are executed in the operating environment in which the framework objects exist and which is directly visible to the host operating system. That is, the server process program is a running program. The phrase "server process program" and "server process" will be used interchangeably to refer to the extended framework in the illustrated operating environment. The end user directly or indirectly starts the server process when any of the server functions supported are desired. The Server Process and provider objects are contained within the server process program. The server process program provides server management features such as starting and stopping the server processing, starting and stopping specific objects, dynamic tuning of server process resources such as memory and process threads, and other functions related to the server process program itself.

The Server Process object is the encapsulation of the logic that provides specific server services, such as print serving, file serving, mail serving, security, transaction processing, and the like. The Server Process objects must have an associated Implicit Data Handling Registry (IDHR) object and must provide the four methods that will be called during operation of the server process. The four Provider methods encapsulate the logic that provides specific implicit data handling services. The operation of these methods will become clear in conjunction with the following descriptions of the FIGS. 6–9 flow diagrams.

In a preliminary, pre-request processing step represented by the flow diagram box numbered 602, an initialization process for the implicit data provider is carried out in which the Provider Objects register with the IDHR object. The preliminary nature of this processing step is represented by the dashed line connecting it to the next flow diagram box, which represents the initiation of a remote request from a remote process. Those skilled in the art will appreciate that such remote requests are typical of conventional distributed processing environments, and no further explanation of such processing is necessary. In the next processing step, remote request marshaling logic performs whatever request marshaling is necessary so that implicit data can be processed. Such marshaling processing is well known to those skilled in the art and should be understood without further explanation. Those skilled in the art will understand that the marshaling processing requests the IDHR to gather any and all implicit data that should be sent with the remote method request that was received in the prior processing flow diagram box.

After all of the implicit data has been gathered, the IDHR checks to see if a registered Implicit Data Provider remains to have implicit data gathered. That is, each registered IDP is getting an opportunity to provide implicit data. This processing is represented by the flow diagram box numbered 608, which is described in greater detail in FIG. 7.

Figure 6:
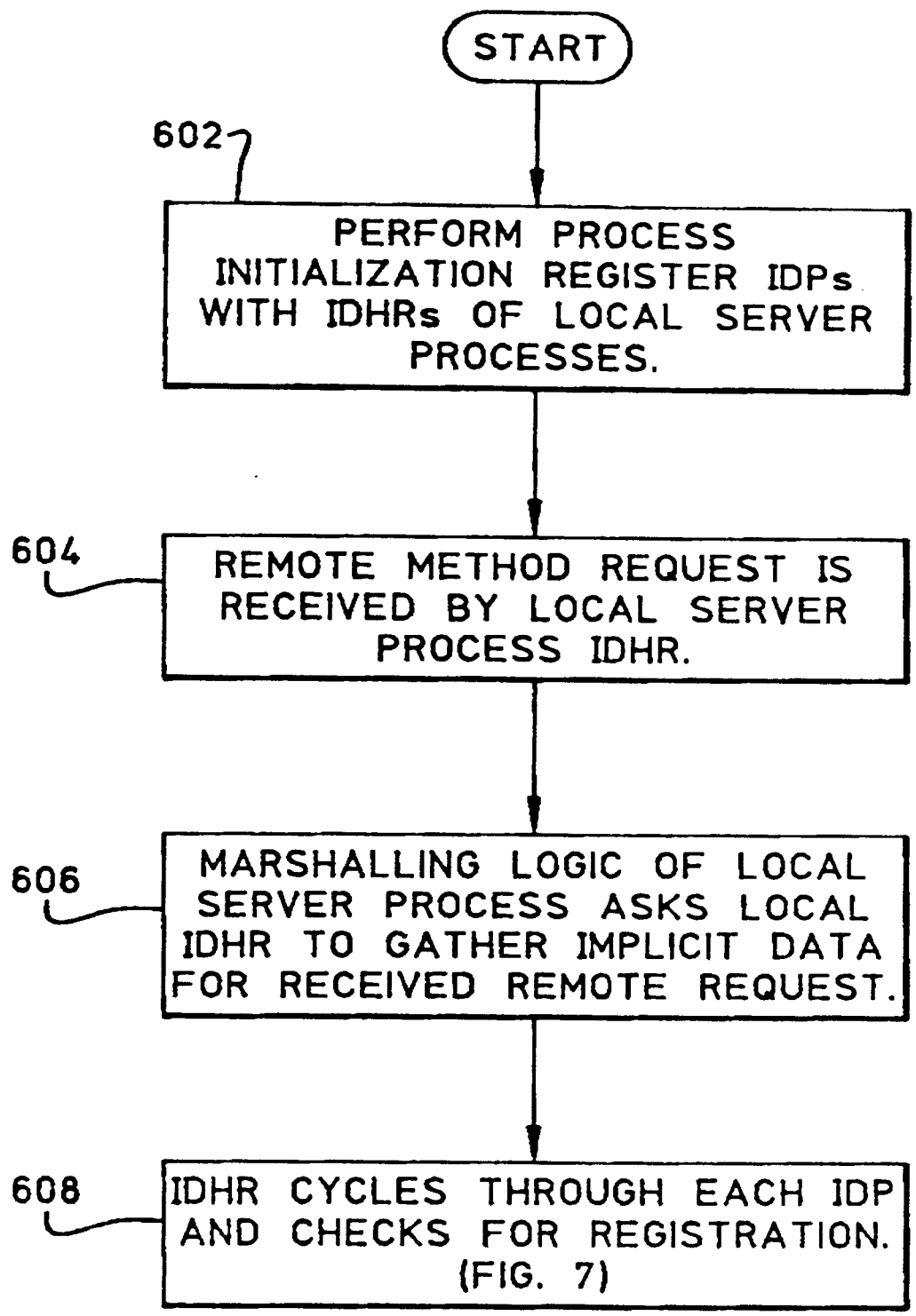
FIG. 6, FIG. 7, FIG. 8, and FIG. 9 are flow diagram representations of the processing carried out by the Server Process category illustrated in FIG. 4.
Figure 7:
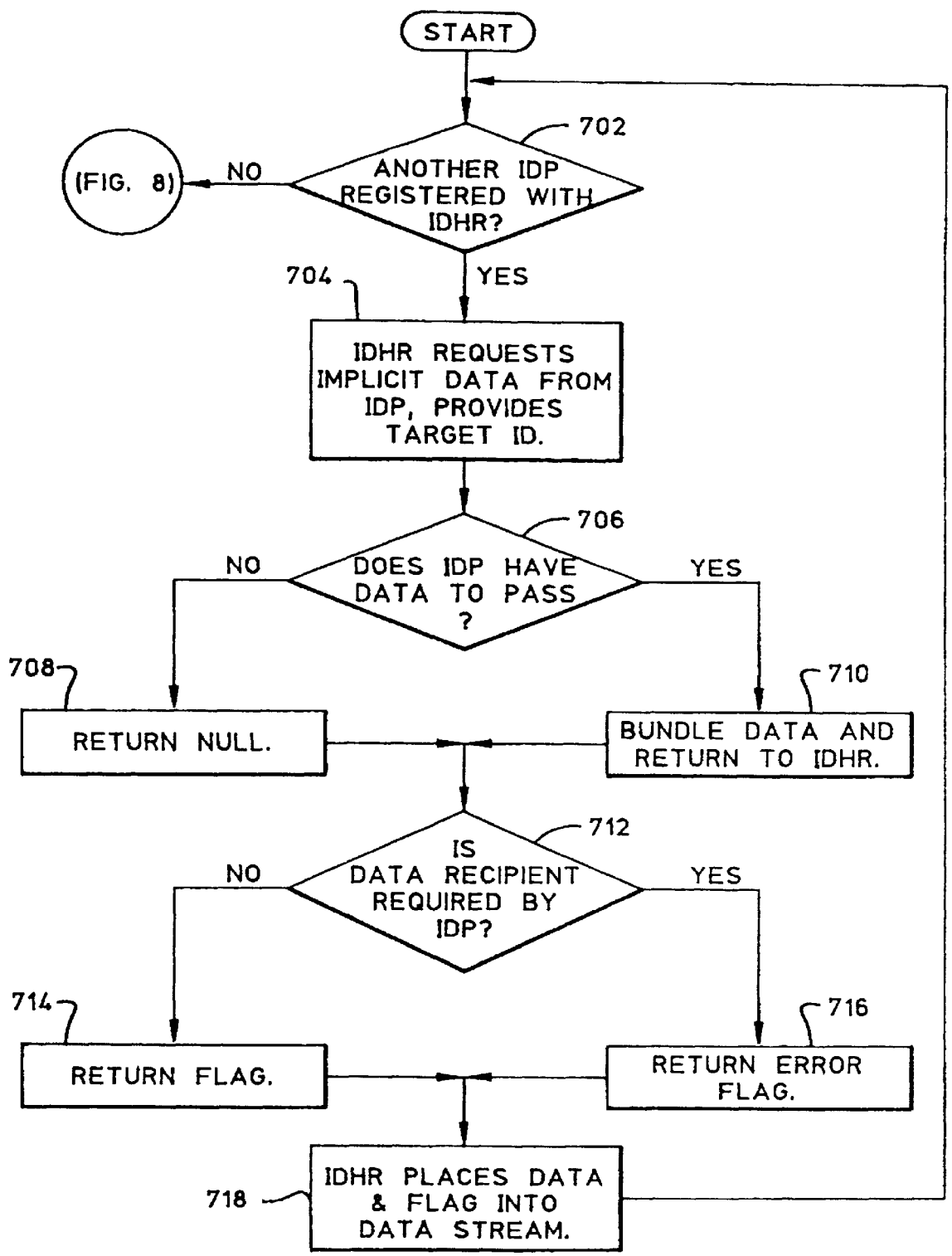

Processing of the FIG. 6 flow diagram box numbered 608 is illustrated in FIG. 7. The first processing of FIG. 7 is indicated by the decision box numbered 702, which indicates that the IDHR checks to determine if another IDP is registered. If no further IDP objects are registered, a negative outcome at the decision box, then processing continues with the flow diagram of FIG. 8. If additional IDP objects are registered, and affirmative outcome, then processing continues with the flow diagram box numbered 704. This processing represents the IDHR asking the IDP object for any implicit data that it may want to provide for the remote method request. The IDHR provides the identity of the target objects on which the remote method request is being made so that if the IDP object has special implicit data providing logic that is based upon the target object it will know the identity of the target object. Next, at the decision box numbered 706, the IDHR checks to determine if the IDP object has implicit data to pass the remote the method. If the IDP has no implicit data for the current remote method request, it returns a null result to the IDHR. This processing is represented by the flow diagram box numbered 708. If the IDP has implicit data for the remote method request, then it bundles the implicit data into a generic object and returns the implicit data object to the IDHR for sending with the remote method request. Its processing is indicated by the flow diagram box numbered 710.

Next, the IDHR determines if it is important to the IDP object whether an IDP is registered in the target process (remote method) to receive its implicit data. An appropriate flag indicating the importance of delivery will be returned. Thus, the decision box numbered 712 indicates that the IDHR checks to determine if the data recipient receives the implicit data. A negative outcome results in the processing of the flow diagram box numbered 714, which indicates that a return flag indicating acknowledgment is not necessary. Affirmative response of the decision box numbered 712 results in the processing represented by the flow diagram box numbered 716, which indicates that the IDP object provides an IDHR with a flag that indicates the IDHR in the remote process should issue an error indication if a corresponding IDP object is not registered in the remote method process to receive the implicit data. After the appropriate flag is returned to the IDHR, processing continues with the flow diagram box numbered 718, which indicates that the IDHR places the implicit data bundle and the acknowledgment handling flag in the remote method request stream and inserts the identification of the IDP object that provided the piece of implicit data. Processing then loops back to the decision box numbered 702 and continues for each of the implicit data provider objects that are registered. Eventually, all of the registered IDP objects are processed, and the outcome at the decision box numbered 702 becomes negative. When that occurs, processing continues with the FIG. 8 flow diagram, as indicated by the off-page connector.

Figure 8:
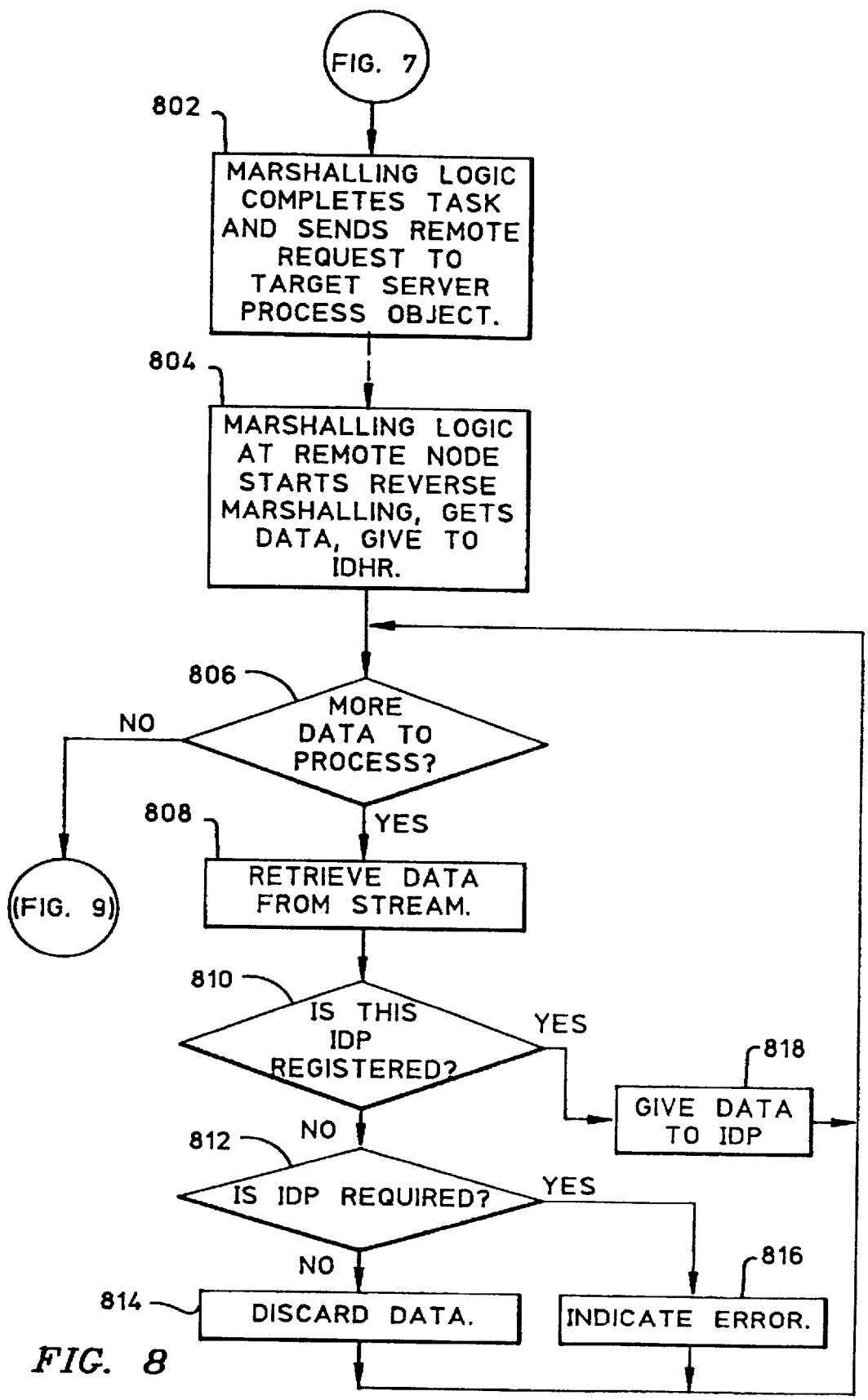

In FIG. 8, the first processing step is for the distribution marshaling logic to complete whatever marshaling remains to be done and then for the remote method request to be sent to the target object in the remote process. Such marshaling processing is conventional in a distributed processing environment and should be understood by those skilled in the art without further explanation. This processing is represented by the flow diagram box numbered 802. Next, as indicated by the connecting line numbered 803, the remote method request flows through the communications software through the remote process. This also is conventional communication processing, the details of which should be understood by those skilled in the art without further explanation.

The next processing step is represented by the flow diagram box numbered 804, which indicates that marshaling logic in the remote process receives the method request and begins "reverse" marshaling processing. This, again, is conventional processing for a distributed computing environment and should be understood by those skilled in the art without further explanation. As is conventional, the reverse marshaling logic eventually reaches the implicit data that is embedded in the remote method request and calls its IDHR to process the implicit data. At the decision box numbered 806, the IDHR of the remote process checks to determine if additional implicit data must be processed before the incoming remote method request is processed. This processing is indicated by the decision box numbered 806. If there is no more implicit data to process, a negative outcome at the decision box 806, then processing continues with the FIG. 9 flow diagram, as indicated by the off-page connector. If additional implicit data must be processed, an affirmative outcome at the decision box 806, then the IDHR retrieves the next portion of implicit data from the input stream along with the corresponding delivery handling flag and IDP object identifier. This information represents the implicit data and associated processing information that was provided by a single IDP object in the remote calling process, and is represented by the flow diagram box numbered 808. Next, the IDHR checks to determine if there is an IDP object registered with the remote IDHR for this IDP object identifier. This checking is represented by the flow diagram box numbered 810.

If there is no IDP object registered with the remote IDHR having the IDP object identifier being checked, a negative outcome at the decision box 810, then an IDP object with this IDP identifier was not registered. As a result, the IDHR of the remote method checks to determine if the delivery handling flag indicates that this implicit data must be delivered to an IDP object, as represented by the decision box numbered 812. In other words, the remote IDHR checks to determine if an IDP object with this IDP identifier is expected to be registered. If no registration is expected, a negative outcome at the decision box 812, then no IDP with this IDP identifier is expected to be registered and therefore the implicit data can be discarded. This processing is represented by the flow diagram box numbered 814. If the delivery flag indicates that an IDP is expected, indicating that an IDP object with its IDP identifier is expected to be registered with the IDHR, then the implicit data can be discarded but an error indication must be registered. This processing is indicated by flow diagram box numbered 816.

Back at the decision box where registration of the IDP object was checked, the decision box 810, an affirmative outcome indicates that an IDP object having the subject IDP identifier is registered with the remote IDHR. Therefore, the implicit data received must be provided to the IDP for processing and an indication must be registered that the implicit data was received by the remote IDP object with the remote method request. This processing is indicated by the flow diagram box numbered 818. After processing of the IDP to check for registration and after processing of both unregistered IDP objects (flow diagram boxes 812–816) and registered IDP objects (flow diagram box 818), processing loops back to the decision box numbered 806, where processing continues for additional implicit data objects. Eventually, the IDHR finds that there is no more implicit data to process from the incoming remote method request, a negative outcome at the decision box 806, and processing continues with the flow diagram of FIG. 9, as represented by the off-page connector.

Figure 9:
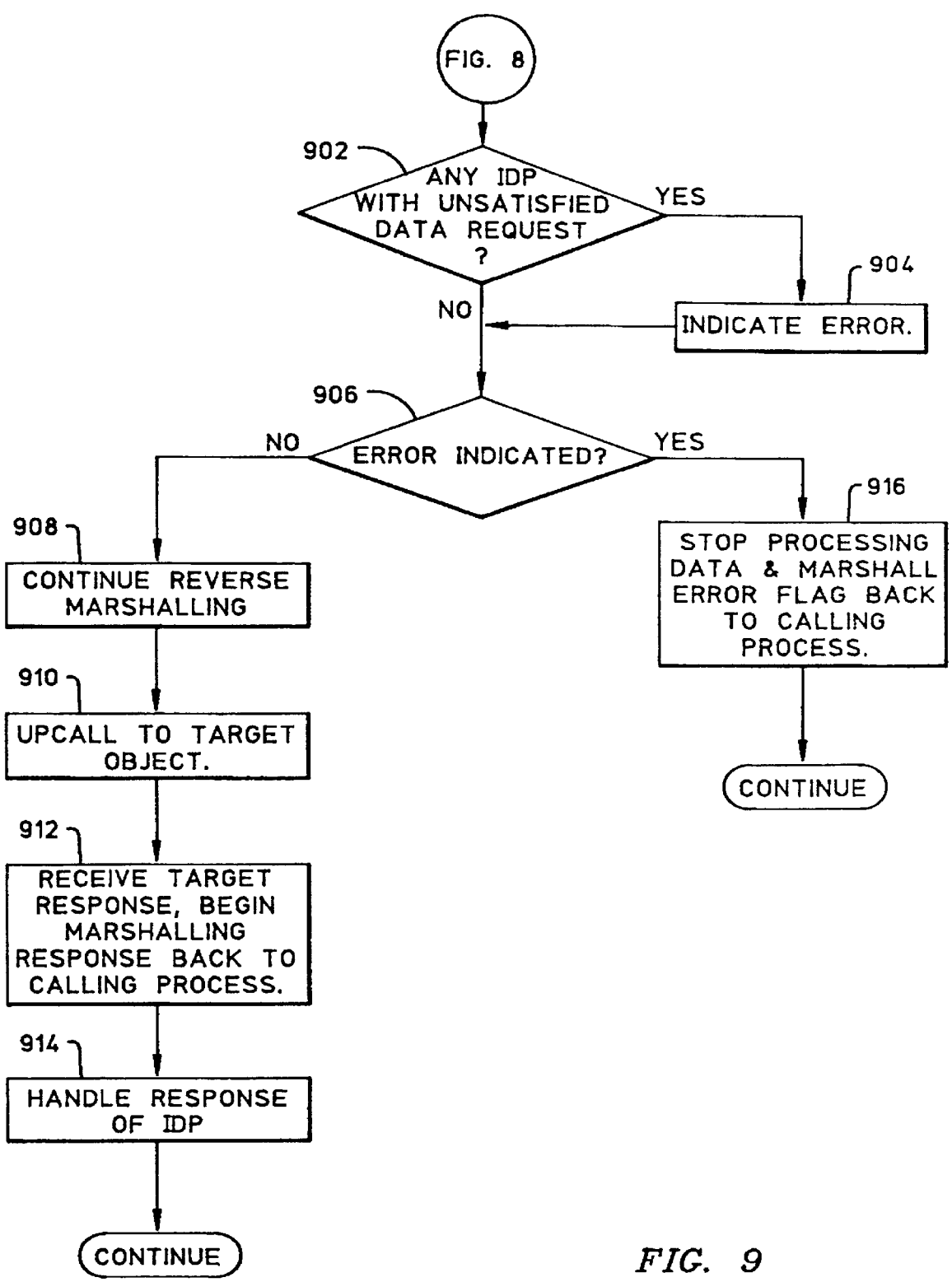

In the first processing step illustrated in FIG. 9, the IDHR checks to determine if there were registered IDP objects that did not receive implicit data with the remote method request, but have indicated that they expected to receive such implicit data. An affirmative outcome at the decision box indicates that at least one registered IDP object has indicated that it expected to receive implicit data with each remote method request and did not receive implicit data with the current remote method request. Therefore, an error indication must be registered by the IDHR. This processing is indicated by the flow diagram box numbered 904. If no such inconsistency occurred, then processing proceeds directly from the decision box numbered 902 to the next processing step, represented by the decision box numbered 906.

At the next decision box 906, the IDHR checks to determine if any errors were registered during the processing of the implicit data for the subject remote method request. If no errors were detected during the processing of the implicit data for the remote method request, a negative outcome at decision box 906, then control is returned to the reverse marshaling logic, which completes the reverse marshaling of the remote method request. This processing is indicated by the flow diagram box numbered 908 and its conventional processing should be known to those skilled in the art without further explanation. Next, the remote method request is passed to the target object so that the object that knows how to process the method request is provided with it. Its processing is indicated by the flow diagram box numbered 910. After the remote method request has been processed by the appropriate surface object, the marshaling logic will marshal the method result back to the calling routine. This processing also is conventional for a distributed processing environment and therefore should be known to those skilled in the art without further explanation. This processing is represented by the flow diagram box numbered 912.

During the marshaling of the response back to the calling routine, the marshaling logic will call the IDHR object to provide implicit data with the method response. The processing is the same as the implicit data processing that was performed during the initial sending of the remote request. That is, processing steps analogous to the processing carried out in FIGS. 7 and 8 will be performed for the response, as it was with the request. The difference in the response processing is that the IDP objects will be aware that a result is being sent back to the calling routine. The IDP objects may contain internal logic that provides different implicit data, as desired by the system designer. Processing then continues, as desired.

If an error was registered during the processing of the implicit data for the remote request, an affirmative outcome at the decision box numbered 906, then processing for the remote method request is halted and the error is sent back to the calling routine for appropriate handling. This process is represented by the flow diagram box numbered 916. Such remote error processing is then performed, as indicated by the continuation box.

Advantages of the Invention

Thus, the reusable framework of the invention provides a set of objects that perform server functioning and permit a framework user to add extensions to the framework for specific processing features, thereby producing a server program for performing server processing in an operating system. A server program developer can thereby more quickly conclude program development and maintain programs with updates and improvements. The developer must provide the end-user interface, which establishes a means for the end-user to communicate with the program to receive and process the server functions. The program developer is thereby free to concentrate on program features, building upon the framework. In this way, implicit data handling is controlled through registration with the IDHR objects and is transparent to the Server Process objects.

We claim:

1. A computer data processing system having a plurality of interconnected network nodes that each provide an operating environment in which computer processes are executed, such that each local network node comprises:

a central processing unit;

a user interface; and a main memory having an operating system that supports an object oriented programming environment, said main memory further containing a framework that provides an extensible server process that includes:

(a) a Process object category of objects that provide a service process for the network, and provide and receive implicit data from remote processes of the network, said implicit data being data for supporting a request from a requesting process to a service process remote from the requesting process, which is not provided as part of the request by the requesting process and which is not inherently available to the service process, and (b) an Implicit Data Handler Registry (IDHR) class of objects that receive registration information from a Provider class of objects in the Process category, wherein each Provider object registers with the IDHR if it produces implicit data for use by remote processes that request the service of the process object class, such that the Provider object produces implicit data for network processing of remote processes, receives implicit data from remote processes, provides implicit data in reply to a request from a remote process, and receives implicit reply data back from Provider objects at remote nodes from whom service was requested, so that implicit data handling is transparent to the Process objects.

2. A computer data processing system as defined in claim 1, wherein each of the Provider objects includes methods comprising:

a provideImplicitDataForRequest method that provides implicit data to the IDHR class of objects for sending to a remote Process object when requested;

a receiveImplicitDataFromRequest method that provides implicit data to the Provider from a remote Process object;

a provideImplicitDataForReply method that provides implicit data to the IDHR class of objects for sending to a remote Process object to confirm receipt of a remote request; and a receiveImplicitDataFromReply method that provides implicit data to the Provider from a remote Process object to confirm receipt of a result of the remote Process.

3. A computer data processing system as defined in claim 2, wherein the IDHR object of a remote Process object checks for processing errors upon receipt of implicit data and explicit data from a data service request.

4. A computer data processing system as defined in claim 3, wherein the Provider object provides implicit data and process results of the requested remote Process object.

5. A computer data processing system as defined in claim 3, wherein the Provider object receives implicit data with process results for a process requested of a remote Process object.

6. An object oriented extensible server program framework for use in a computer system having a plurality of interconnected network nodes that each provide an operating environment in which computer processes are executed, such that each local network node provides an operating system that supports an object oriented programming environment and includes a memory in which cooperating objects comprising object classes can be stored, the framework providing an extensible service program for the computer system and further including:

a Process object category of objects that provide a service process for the network, and provide and receive implicit data from remote processes of the network, said implicit data being data for supporting a request from a requesting process to a service process remote from the requesting process, which is not provided as part of the request by the requesting process and which is not inherently available to the service process; and an Implicit Data Handler Registry (IDHR) class of objects that receive registration information from a Provider class of objects in the Process category;

wherein each Provider object registers with the IDHR if it produces implicit data for use by remote processes that request the service of the process object class, such that the Provider object produces implicit data for network processing of remote processes, receives implicit data from remote processes, provides implicit data in reply to a request from a remote process, and receives implicit reply data back from Provider objects at remote nodes from whom service was requested, so that implicit data handling is transparent to the Process objects.

7. A framework as defined in claim 6, wherein each of the Provider objects includes methods comprising:

a provideImplicitDataForRequest method that provides implicit data to the IDHR class of objects for sending to a remote Process object when requested;

a receiveImplicitDataFromRequest method that provides implicit data to the Provider from a remote Process object;

a provideImplicitDataForReply method that provides implicit data to the IDHR class of objects for sending to a remote Process object to confirm receipt of a remote request; and receiveImplicitDataFromReply method that provides implicit data to the Provider from a remote Process object to confirm receipt of a result of the remote Process.

8. A framework as defined in claim 7, wherein the IDHR object of a remote Process object checks for processing errors upon receipt of implicit data and explicit data from a data service request.

9. A framework as defined in claim 8, wherein the Provider object provides implicit data and process results of the requested remote Process object.

10. A framework as defined in claim 8, wherein the Provider object receives implicit data with process results for a process requested of a remote Process object.

11. A program product data storage device, tangibly embodying a program of machine-readable instructions executable by a computer system having an operating system that supports an object oriented programming environment, the program product comprising:

a recordable media; and a framework recorded on the recordable media, the framework providing an extensible server process including a Process object category of objects that provide a service process for the network, and provide and receive implicit data from remote processes of the network, said implicit data being data for supporting a request from a requesting process to a service process remote from the requesting process, which is not provided as part of the request by the requesting process and which is not inherently available to the service process, and an Implicit Data Handler Registry (IDHR) class of objects that receive registration information from a Provider class of objects in the Process category, wherein each Provider object registers with the IDHR if it produces implicit data for use by remote processes that request the service of the process object class, such that the Provider object produces implicit data for network processing of remote processes, receives implicit data from remote processes, provides implicit data in reply to a request from a remote process, and receives implicit reply data back from Provider objects at remote nodes from whom service was requested, so that implicit data handling is transparent to the Process objects.

12. A program product as defined in claim 11, wherein each of the Provider objects includes methods comprising:

a provideImplicitDataForRequest method that provides implicit data to the IDHR class of objects for sending to a remote Process object when requested;

a receiveImplicitDataFromRequest method that provides implicit data to the Provider from a remote Process object;

a provideImplicitDataForReply method that provides implicit data to the IDHR class of objects for sending to a remote Process object to confirm receipt of a remote request; and a receiveImplicitDataFromReply method that provides implicit data to the Provider from a remote Process object to confirm receipt of a result of the remote Process.

13. A program product as defined in claim 12, wherein the IDHR object of a remote Process object checks for processing errors upon receipt of implicit data and explicit data from a data service request.

14. A program product as defined in claim 13, wherein the Provider object provides implicit data and process results of the requested remote Process object.

15. A program product as defined in claim 13, wherein the Provider object receives implicit data with process results for a process requested of a remote Process object.

16. A method of distributing a program product, the method comprising the steps of:

establishing a connection between a first computer system and a second computer system; and transmitting the program product from the first computer system to the second computer system, wherein the program product comprises an object oriented framework providing an extensible server process program for the computer system and further including a Process object category of objects that provide a service process for the network, and provide and receive implicit data from remote processes of the network, said implicit data being data for supporting a request from a requesting process to a service process remote from the requesting process, which is not provided as part of the request by the requesting process and which is not inherently available to the service process; and an Implicit Data Handler Registry (IDHR) class of objects that receive registration information from a Provider class of objects in the Process category;

wherein each Provider object registers with the IDHR if it produces implicit data for use by remote processes that request the service of the process object class, such that the Provider object produces implicit data for network processing of remote processes, receives implicit data from remote processes, provides implicit data in reply to a request from a remote process, and receives implicit reply data back from Provider objects at remote nodes from whom service was requested, so that implicit data handling is transparent to the Process objects.

17. A method as defined in claim 16, wherein each of the Provider objects includes methods comprising:

a provideImplicitDataForRequest method that provides implicit data to the IDHR class of objects for sending to a remote Process object when requested;

a receiveImplicitDataFromRequest method that provides implicit data to the Provider from a remote Process object;

a provideImplicitDataForReply method that provides implicit data to the IDHR class of objects for sending to a remote Process object to confirm receipt of a remote request; and a receiveImplicitDataFromReply method that provides implicit data to the Provider from a remote Process object to confirm receipt of a result of the remote Process.

18. A method as defined in claim 17, wherein the IDHR object of a remote Process object checks for processing errors upon receipt of implicit data and explicit data from a data service request.

19. A method as defined in claim 18, wherein the Provider object provides implicit data and process results of the requested remote Process object.

20. A method as defined in claim 18, wherein the Provider object receives implicit data with process results for a process requested of a remote Process object.

\* \* \* \* \*